United States Patent [19]

Yamauchi

[11] Patent Number: 5,483,850
[45] Date of Patent: Jan. 16, 1996

[54] TRANSMISSION

[75] Inventor: Yasuhiro Yamauchi, Fuji, Japan

[73] Assignee: Jatco Corporation, Fuji, Japan

[21] Appl. No.: 198,358

[22] Filed: Feb. 18, 1994

[30] Foreign Application Priority Data

Mar. 5, 1993 [JP] Japan .................................. 5-044926

[51] Int. Cl.⁶ .................................................. F16H 57/02
[52] U.S. Cl. ..................................... 74/606 R; 192/85 AA
[58] Field of Search ..................... 74/606 R; 192/85 AA, 192/85 R, 115, 3.21, 3.29

[56] References Cited

U.S. PATENT DOCUMENTS

| | | | |
|---|---|---|---|
| 4,693,353 | 9/1987 | Kobayashi et al. | 192/85 AA |
| 4,858,492 | 8/1989 | Takano et al. | 192/85 AA |
| 4,949,821 | 8/1990 | Murota et al. | 192/3.21 |
| 4,982,826 | 1/1991 | Holbrook | 192/85 AA |
| 5,064,040 | 11/1991 | Johnson | 192/85 AA |
| 5,174,423 | 12/1992 | Tsukamoto et al. | 192/3.29 |
| 5,197,583 | 3/1993 | Sakai et al. | 192/85 AA |
| 5,226,517 | 7/1993 | Grochowski | 192/85 AA |
| 5,388,679 | 2/1995 | Inoue et al. | 192/85 AA |

FOREIGN PATENT DOCUMENTS 5-223130  8/1993  Japan .................. 192/85 AA

*Primary Examiner*—Vinh T. Luong
*Attorney, Agent, or Firm*—Foley & Lardner

[57] ABSTRACT

A transmission includes a stationary sleeve having an axis, and an oil pump cover extending radially outward with respect to the axis. The oil pump cover is formed with a bore receiving said stationary sleeve and a wall member defining the bore. The oil pump cover includes an annular flange formed integrally therewith and coupled with the stationary sleeve and axially disposed adjacent the bore to hold the oil pump cover in juxtaposed position with respect to the axis. Serrations are formed on an inner circumferential surface of the oil pump cover and an outer circumferential surface of the stationary sleeve. The annular flange of the oil pump cover engages a shoulder formed on a reduced diameter section of the stationary sleeve. Fluid passages are formed in the oil pump cover and the stationary sleeve and fluidly communicated with each other.

4 Claims, 5 Drawing Sheets

5,483,850

TRANSMISSION

BACKGROUND OF THE INVENTION

The present invention relates to a transmission for vehicles, and more particularly to a mounting of a radially extending member onto a stationary sleeve.

U.S. Pat. No. 4,693,353 discloses a support for supporting a transmission shaft and a clutch drum in an automatic transmission apparatus. The support includes inner and outer stationary sleeves having a common axis, and a radially extending portion having a bore receiving the sleeves and extending radially outward with respect to the axis. The inner sleeve receives the transmission shaft and the outer sleeve supports the clutch drum thereon.

SUMMARY OF THE INVENTION

An object of the present invention is to provide a transmission in which positioning of a radially extending member in juxtaposed relationship with respect to an axis of a stationary sleeve is simplified and easy.

According to the present invention, there is provided in a transmission:

a stationary sleeve having an axis; and a radially extending member formed with a bore receiving the stationary sleeve and extending radially outward with respect to the axis, the radially extending member including wall means defining the bore;

the radially extending member including an integral annular flange coupled with the stationary sleeve, the integral annular flange being axially disposed adjacent the bore to hold the radially extending member in juxtaposed position with respect to the axis of the stationary sleeve.

DESCRIPTION OF THE PREFERRED EMBODIMENT

Figure 1:
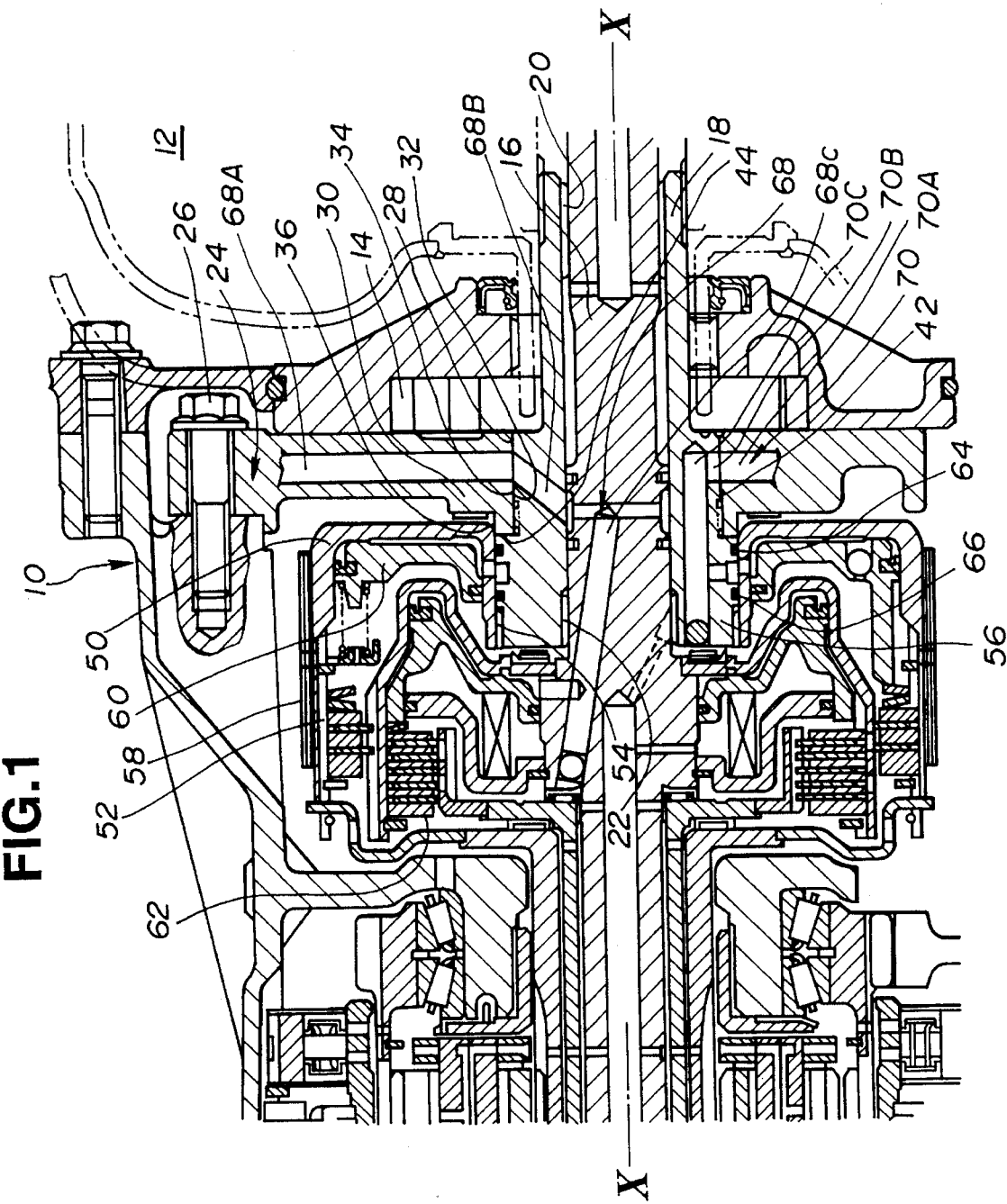
FIG. 1 is a cross-sectional view, taken along line 1—1 of FIG. 5, of an automatic transmission to which a mounting of a radially extending oil pump cover onto a stationary sleeve, according to the present invention is applied.

Referring now to FIG. 1, there is shown an automatic transmission including a transmission case 10 and a torque converter 12 disposed adjacent the transmission case 10. As shown in FIG. 1, an oil pump 14 is drivingly connected to the torque converter 12 for supplying hydraulic fluid thereto. An input shaft 16 driven by the torque converter 12 extends through the oil pump 14 and the transmission case 10.

Figure 2:
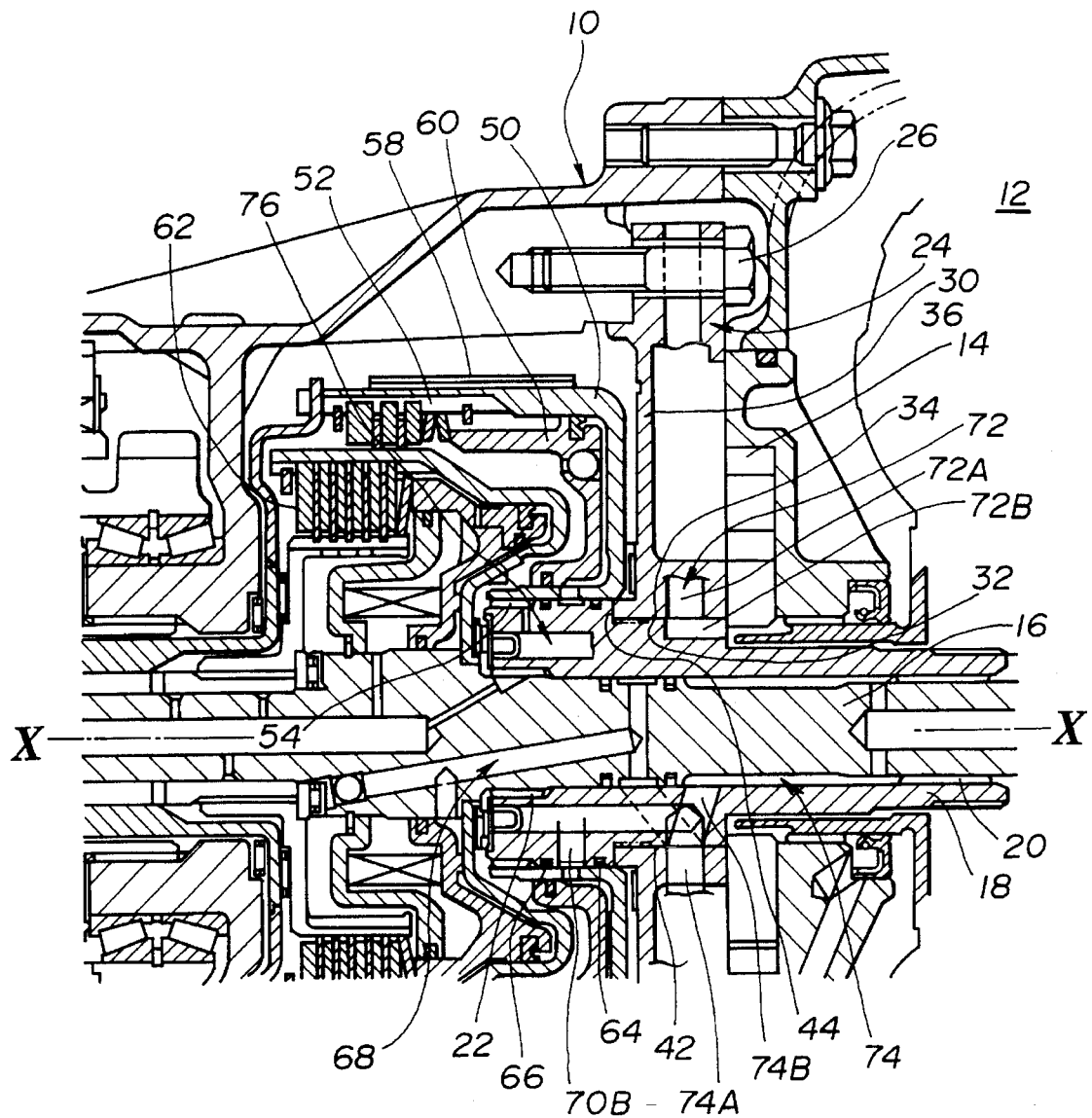
FIG. 2 is a view similar to FIG. 1 but showing a different section, taken along line 2—2 of FIG. 5.

As shown in FIGS. 1 and 2, a stationary sleeve 18 having an axis X supports the input shaft 16 at opposed end portions thereof by bearings 20 and 22. The stationary sleeve 18 is made of a metal including iron.

As seen in FIGS. 1 and 2, the oil pump 14 includes a disc-shaped oil pump cover 24 extending radially outward with respect to the axis X. The oil pump cover 24 is made of aluminum alloy and secured at its outer peripheral portion to the transmission case 10 by means of a bolt 26. The oil pump cover 24 is formed with a bore 28 receiving the stationary sleeve 18 and includes a radially extending wall member 30 defining the bore 28. The wall member 30 includes an inner circumferential surface 32 engaged with an outer circumferential surface 34 of the stationary sleeve 18. As shown in FIGS. 1 and 2, the wall member 30 also includes an integral annular flange 36 coupled with the outer circumferential surface 34 of the stationary sleeve 18. The integral annular flange 36 is axially disposed adjacent the bore 28 to hold the radially extending oil pump cover 24 in juxtaposed position with respect to the axis X of the stationary sleeve 18.

Figure 3:
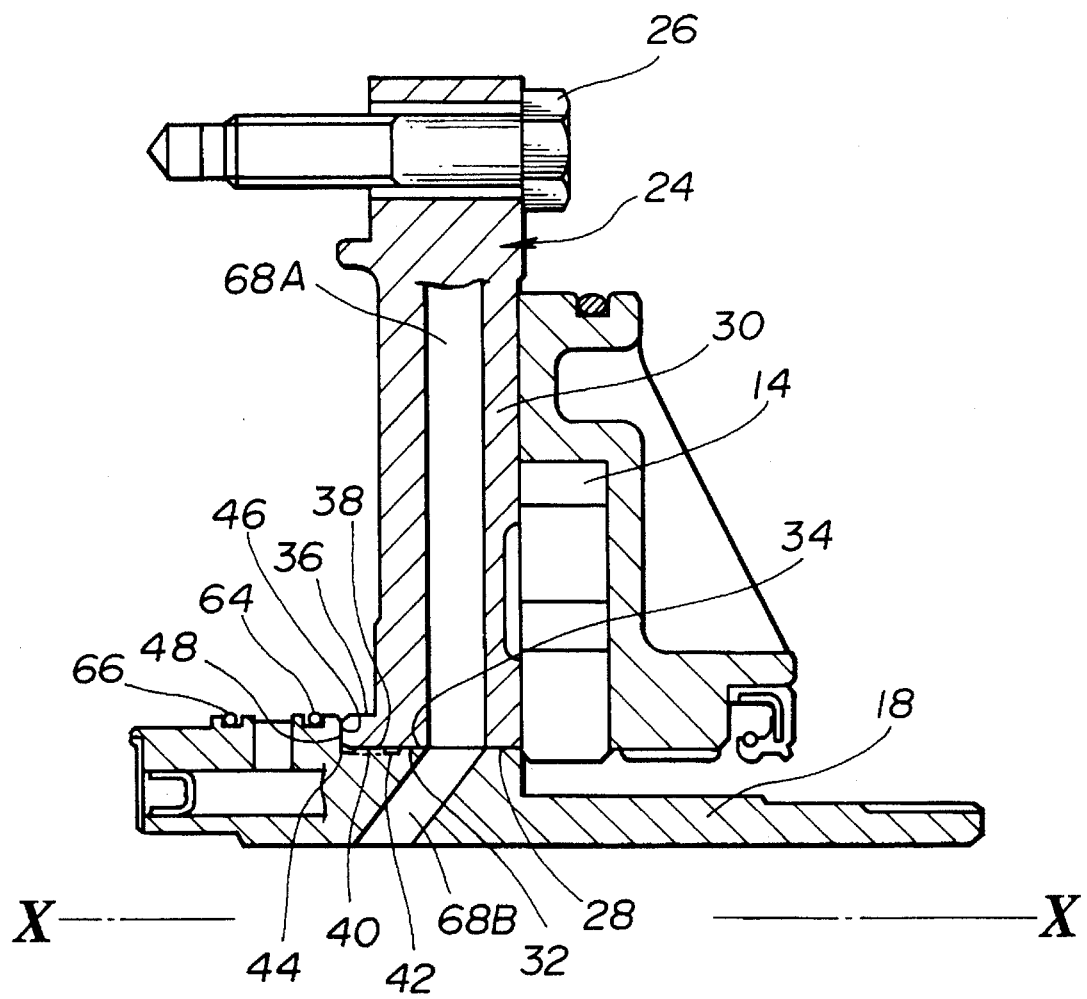
FIG. 3 is an enlarged view of an essential part of the automatic transmission, showing the stationary sleeve and the oil pump cover coupled therewith.
Figure 4:
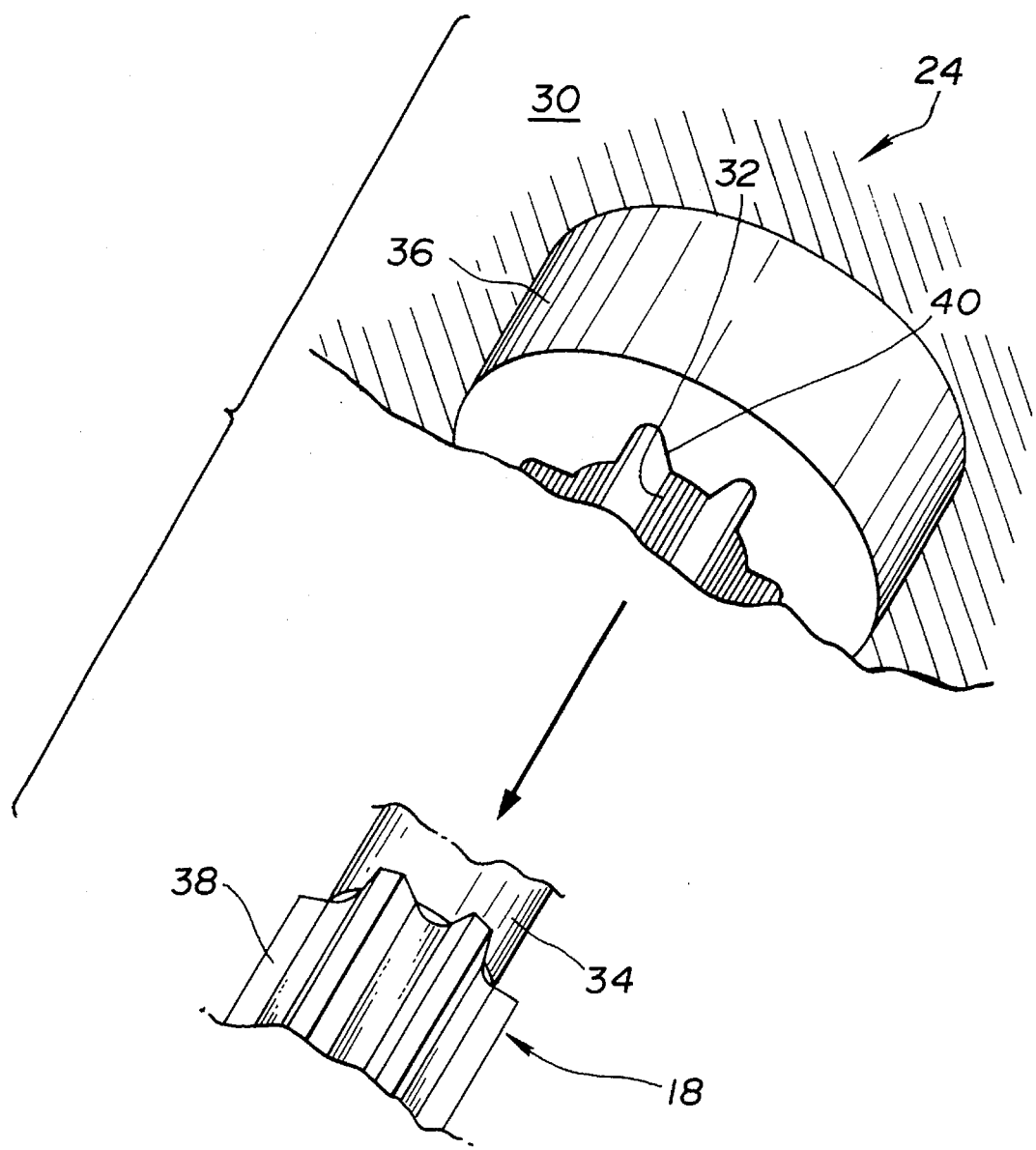
FIG. 4 is a fragmentary enlarged and exploded perspective view of FIG. 3, showing serrations formed on the stationary sleeve and the oil pump cover, respectively.

As best seen in FIGS. 3 and 4, the outer circumferential surface 34 of the stationary sleeve 18, and the inner circumferential surface 32 of the wall member 30 are formed with serrations 38 and 40. The provision of the serrations 38 and 40 serves for preventing a relative rotation of the stationary sleeve 18 and the oil pump cover 24.

As shown in FIGS. 1 and 2, the stationary sleeve 18 includes a reduced outer diameter section 42 defining a shoulder 44 which is engaged with the annular flange 36 of the oil pump cover 24. As best seen in FIG. 3, the shoulder 44 includes a radial face 46 extending radially with respect to the axis X. As best seen in FIG. 3, a radial end face 48 of the annular flange 36 engages the radial face 46 of the shoulder 44. The engagement between the annular flange 36 and the shoulder 44 prohibits axial motion of the oil pump cover 24 on the stationary sleeve 18. Upon assembling, the oil pump cover 24 is fitted onto the stationary sleeve 18 in such a condition that a value of interference therebetween becomes larger than zero at 140° C. at which a hydraulic fluid is normally fed through the oil pump 14.

Referring back to FIGS. 1 and 2, a clutch drum 50 of a reverse clutch 52 is rotatably supported by a bearing 54 on a larger outer diameter section 56 disposed adjacent the reduced outer diameter section 42 of the stationary sleeve 18. Numerals 58 and 60 denote a brake band engageable with the clutch drum 50, and a piston axially slidably disposed in the clutch drum 50, respectively. Numeral 62 denotes a low clutch disposed adjacent the reverse clutch 52, and numerals 64 and 66 denote seal rings fitted onto the larger outer diameter section 56, respectively.

Figure 5:
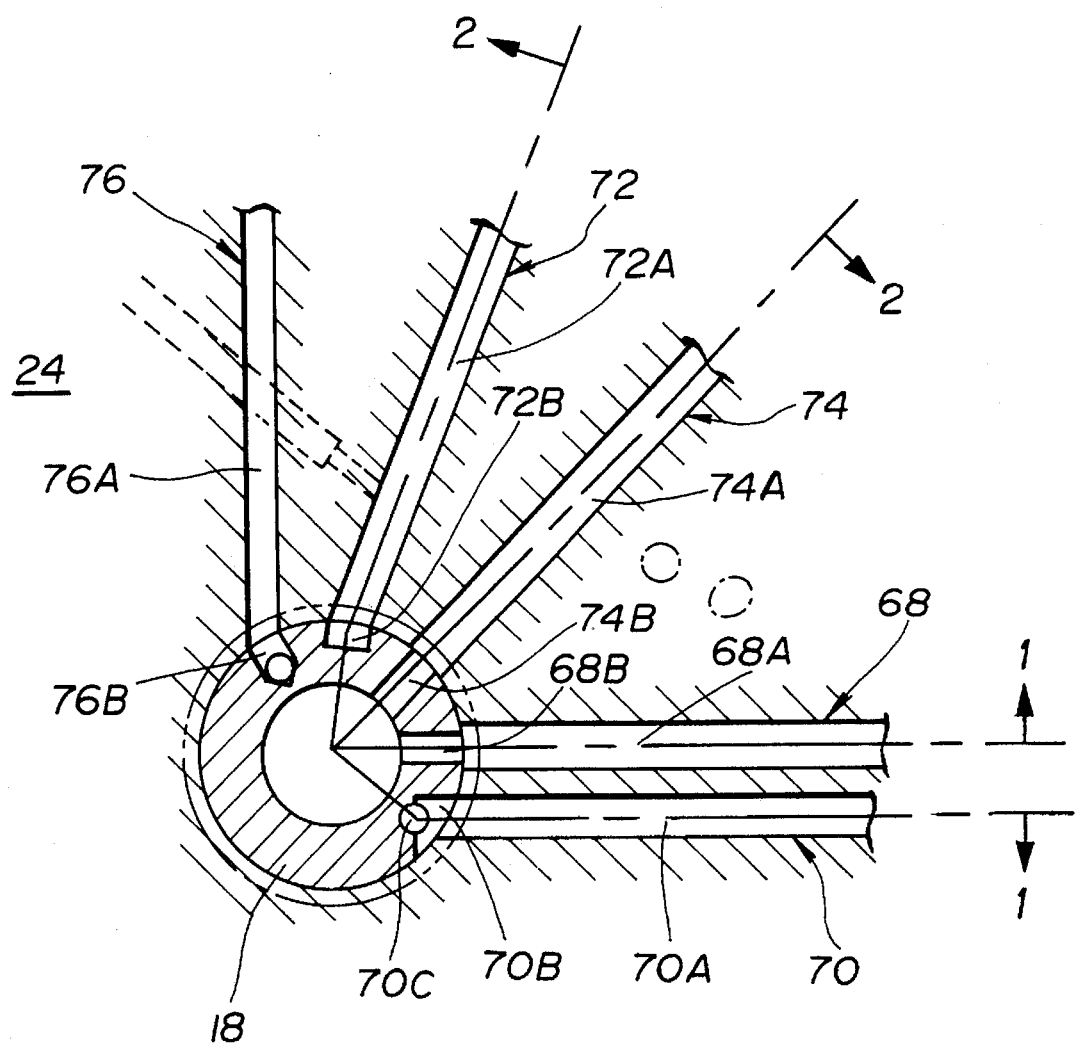
FIG. 5 is a sectional view of the stationary sleeve and the oil pump cover coupled therewith, showing fluid passages formed in the stationary sleeve and oil pump cover.

Referring to FIGS. 1 and 5, there is shown a low clutch circuit 68 for supplying hydraulic fluid to the low clutch 62. As shown in FIGS. 1 and 5, the low clutch circuit 68 includes a fluid passage 68A radially extending in the oil pump cover 24 and communicating with the bore 28, and a fluid passage 68B formed in the stationary sleeve 18. The fluid passage 68B has one end opening within the outer circumferential surface 34 of the stationary sleeve 18, and the other end connected with a fluid passage 68C formed in the input shaft 16 as seen in FIG. 1.

Similarly, referring to FIGS. 1 and 5, there is shown a reverse clutch circuit 70 for supplying hydraulic fluid to the reverse clutch 52. As shown in FIG. 1, the reverse clutch circuit 70 also includes a radial fluid passage 70A radially extending in the oil pump cover 24 and communicating with the bore 28 of the stationary sleeve 18. As seen in FIGS. 1 and 5, a radial groove 70B is formed on the, outer circumferential surface 34 of the stationary sleeve 18. The radial groove 70B has one end connected to an axial fluid passage 70C extending axially in the stationary sleeve 18 as best seen in FIG. 1.

Referring to FIGS. 2 and 5, there is shown an apply circuit 72 for applying hydraulic fluid to the torque converter 12. As shown in FIGS. 2 and 5, the apply circuit 72 includes a radial fluid passage 72A extending radially in the oil pump cover 24 and communicating with the bore 28 of the stationary sleeve 18. As best seen in FIG. 5, a radial groove 72B is formed on the stationary sleeve 18 and has one end opening within the outer circumferential surface 34.

FIGS. 2 and 5 also show a release circuit 74 for releasing hydraulic fluid from the torque converter 12. As shown in FIGS. 2 and 5, the release circuit 74 includes a radial fluid passage 74A extending radially in the oil pump cover 24 and communicating with the bore 28, and a fluid passage 74B formed in the stationary sleeve 18. The fluid passage 74B has two ends communicating with an inner bore of the stationary sleeve 18 and opening within the outer circumferential surface 34, respectively.

Referring back to FIGS. 2 and 5, there is shown a lubricating fluid circuit 76 for supplying lubricating fluid to individual elements disposed within the transmission case 10. As shown in FIG, 5, the lubricating fluid circuit 76 includes a radial fluid passage 76A extending radially in the oil pump cover 24 and communicating with the bore 28. A radial fluid passage 76B is formed in the stationary sleeve 18 and has an end opening within the outer circumferential surface.

The fluid passages and grooves of the low clutch circuit 68, reverse clutch circuit 70, apply circuit 72, release circuit 74, and lubricating fluid circuit 76 are fluidly communicated with each other upon the engagement of the integral annular flange 36 of the oil pump cover 24 with the shoulder 44 of the stationary sleeve 18.

As can be appreciated from the afore-mentioned description, in the transmission according to the present invention, the provision of the integral annular flange on the radially extending member serves for simplifying the positioning of the radially extending member in juxtaposed relationship with respect to the axis X of the stationary sleeve.

Further, in the transmission of the invention, the provision of the integral annular flange serves for preventing inclination of the radially extending member relative to the stationary sleeve, even in a case where a radially extending member having a reduced axial thickness is employed.

In addition, intermeshing of the serrations and the engagement of the annular flange of the radially extending member with the shoulder of the stationary sleeve prevent a relative rotational and axial movement therebetween, so that accurate positioning or alignment of the fluid passages of the stationary sleeve and the radially extending member is accomplished.

What is claimed is:

1. In a transmission:

a stationary sleeve having an axis;

a radially extending member formed with a bore receiving said stationary sleeve and extending radially outward with respect to said axis, said radially extending member including wall means defining said bore;

said radially extending member including an annular flange formed integrally therewith and coupled with said stationary sleeve, said annular flange being axially disposed adjacent said bore to hold said radially extending member in juxtaposed position with respect to said axis of said stationary sleeve;

said stationary sleeve having a reduced diameter section defining a shoulder which engages said annular flange of said radially extending member; and wherein said radially extending member is formed with a first fluid passage communicating with said bore and said stationary sleeve is formed with a second fluid passage having an end opening within an outer circumferential surface of said stationary sleeve, and said first and second fluid passages can be fluidly communicated with each other upon engagement of said annular flange with said shoulder.

2. A transmission as claimed in claim 1, wherein said wall means of said radially extending member and an outer circumferential surface of said stationary sleeve are formed with serrations meshing with each other.

3. A transmission as claimed in claim 1, wherein said radially extending member is made of a metal lighter than a metal which said stationary sleeve is made of.

4. A transmission as claimed in claim 3, wherein said lighter metal includes aluminum.

\* \* \* \* \*